United States Patent
Randall et al.

(10) Patent No.: US 11,899,583 B2
(45) Date of Patent: Feb. 13, 2024

(54) MULTI-DIMENSIONAL CACHE ARCHITECTURE

(71) Applicant: Arm Limited, Cambridge (GB)

(72) Inventors: Joshua Randall, Austin, TX (US); Alejandro Rico Carro, Austin, TX (US); Dam Sunwoo, Austin, TX (US); Saurabh Pijuskumar Sinha, Schertz, TX (US); Jamshed Jalal, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/388,927

(22) Filed: Jul. 29, 2021

(65) Prior Publication Data
US 2023/0029860 A1 Feb. 2, 2023

(51) Int. Cl.
G06F 12/0811 (2016.01)
G06F 12/084 (2016.01)
H04L 45/42 (2022.01)
H04L 49/109 (2022.01)
G06F 12/0813 (2016.01)
G06F 12/0893 (2016.01)

(52) U.S. Cl.
CPC ........ *G06F 12/0811* (2013.01); *G06F 12/084* (2013.01); *G06F 12/0813* (2013.01); *G06F 12/0893* (2013.01); *H04L 45/42* (2013.01); *H04L 49/109* (2013.01)

(58) Field of Classification Search
CPC ............. G06F 12/0811; G06F 12/0813; G06F 12/084; G06F 12/0893
See application file for complete search history.

(56) References Cited

U.S. PATENT DOCUMENTS 9,443,561 B1 * 9/2016 Roberts .................... G11C 5/02

FOREIGN PATENT DOCUMENTS

KR 2019013049 A * 2/2019 ......... G06F 12/0897

OTHER PUBLICATIONS

Halavar, et al.; Accurate Performance Analysis of 3D Mesh Network on Chip Architectures; 2018 IEEE International Conference on Electronics, Computing and Communication Technologies (CONECCT); pp. 1-6; 2018. DOI: 10.1109/CONECCT.2018.8482383.

Weldezion, et al.; Scalability of Network-on-Chip Communication Architecture for 3-D Meshes; 3rd ACM/IEEE International Symposium on Networks-on-Chip; pp. 114-123; 2009. DOI: 10.1109/NOCS.2009.5071459.

* cited by examiner

*Primary Examiner* — Gurtej Bansal
(74) *Attorney, Agent, or Firm* — Pramudji Law Group PLLC; Ari Pramudji

(57) ABSTRACT

Various implementations described herein are directed to a device with a multi-layered logic structure with multiple layers including a first layer and a second layer arranged vertically in a stacked configuration. The device may have a first cache memory with first interconnect logic disposed in the first layer. The device may have a second cache memory with second interconnect logic disposed in the second layer, wherein the second interconnect logic in the second layer is linked to the first interconnect logic in the first layer.

20 Claims, 11 Drawing Sheets

MULTI-DIMENSIONAL CACHE ARCHITECTURE

BACKGROUND

This section is intended to provide information relevant to understanding various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

In some modern circuit designs, chip manufacturing technology is reaching a level of maturity that enables tightly integrated 3D system designs. Some known techniques have sought to quantify the benefits related to 3D network-on-chip (NoC) architectures. However, conventional NoC designs measure performance with synthetic traffic generation without use of practical full system designs. These conventional NoC designs simply assume a system having stacked processing elements despite thermal limitations of such an approach.

Also, router logic complexity adds another barrier to adoption of 3D NoC solutions in conventional NoC designs. Adding a Z-dimension to a mesh network typically increases the number of router ports and adds routing latency. While the benefits of a 3D NoC topology may mitigate the impact of this additional latency, a system that avoids this additional routing complexity is preferred. As such, there exists a need to improve circuit designs that reduce traffic latency while incorporating 3D NoC architecture design.

BRIEF DESCRIPTION OF THE DRAWINGS

Implementations of various memory layout schemes and techniques are described herein with reference to the accompanying drawings. It should be understood, however, that the accompanying drawings illustrate only various implementations described herein and are not meant to limit embodiments of various techniques described herein.

DETAILED DESCRIPTION

Various implementations described herein are directed to multi-dimensional cache memory schemes and techniques for supporting three-dimensional (3D) interconnect logic related applications in reference to 3D physical circuit designs. The multi-dimensional cache architecture may provide 3D cache circuitry having 3D interconnect logic that is implemented with a multi-layered logic structure configured for various 3D cache applications.

Various implementations described herein provide for 3D Network-on-Chip (NoC) architecture that adds a vertical Z-direction to a coherent mesh network (CMN) and that uses 3D router logic for data traffic distribution. The 3D NoC architecture provides for a 3D system layout design strategy with processing elements and home nodes that interface with multiple layers of the NoC. Various schemes and techniques described herein leverage multiple 2D mesh networks to gain the benefit of 3D NoC without the complexity of 3D routing.

Various implementations described herein provide for an NoC system architecture design that inherently distributes traffic injection throughout a 3D NoC and functions without need for conventional 3D routing technology. The 3D NoC designs provided herein distribute requests from each processing element to multiple layers while stacking the cache memory above these processing elements to distribute responding devices. Various implementations described herein provide for 3D L2 cache implementations that operate to interleave L2 sets and associate NoC interfaces between layers, which seeks to achieve effective distribution of requests. Also, various implementations described herein provide 3D NoC topologies that have separable independent 2D mesh topologies by interleaving the address space, which simplifies the router logic design and protocols for 3D interconnect logic.

Various implementations described herein involve use of processing cores with L2 cache memories having split sets that are physically distributed across multiple layers in 3D NoC system architecture. Various implementations utilize a 2-layer system design with face-to-face bonding techniques having each half of split sets of L2 cache residing on each layer of the multiple layers. This split L2 cache may be logically distinguished using a single index bit of the address space, such that all data paths of a split L2 set are on the same layer. Also, each half of the split L2 cache set may have access to its own interface by way of a 3D mesh interconnect link, which may provide a physically separate queue along with an NoC injection point in each layer. Also, this 3D L2 cache design may provide inherent benefits for 3D NoC technology, which may allow for increased capacity with less traffic latency.

Various implementations of providing various multi-dimensional cache architecture with multi-level cache circuitry will be described herein with reference to FIGS. 1A-8.

Figure 1A:
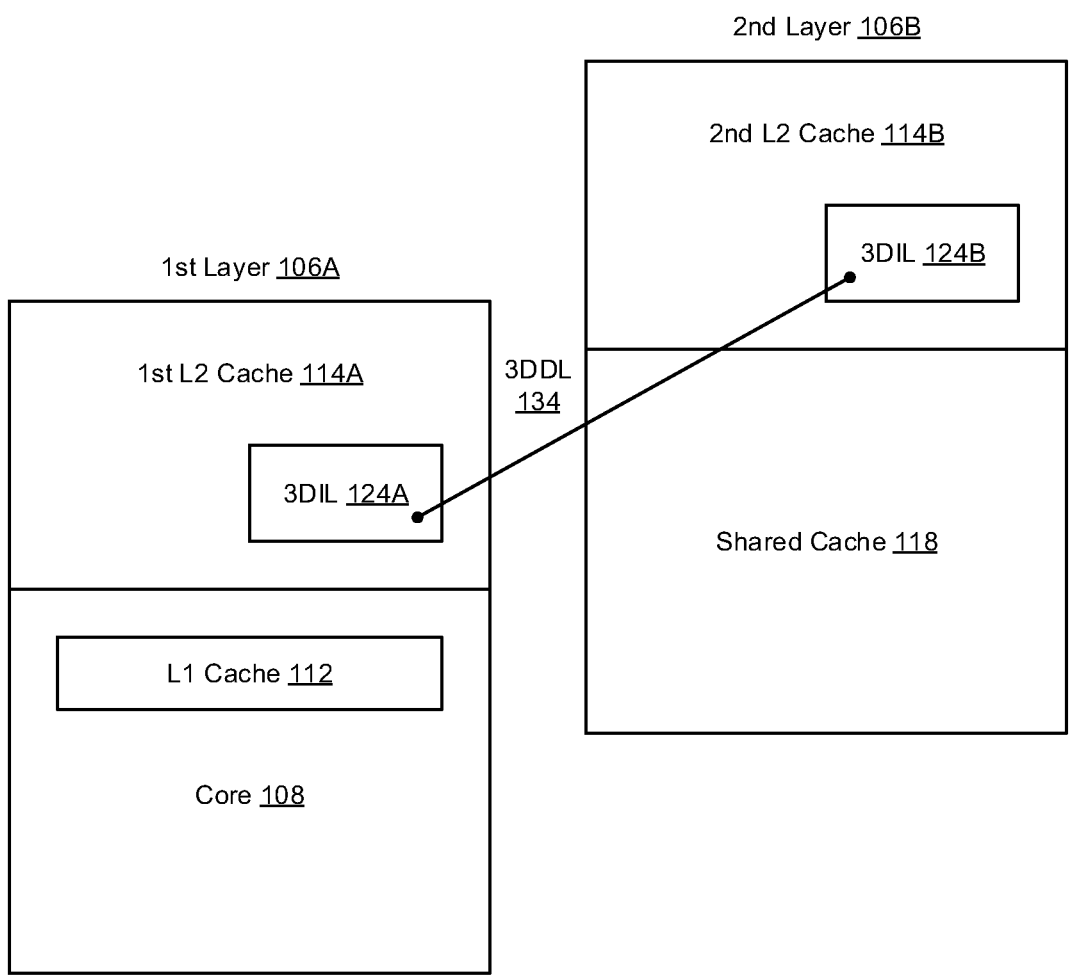
FIGS. 1A-1C illustrate various diagrams of multi-dimensional cache architecture with multi-level cache circuitry in accordance with implementations described herein.
Figure 1B:
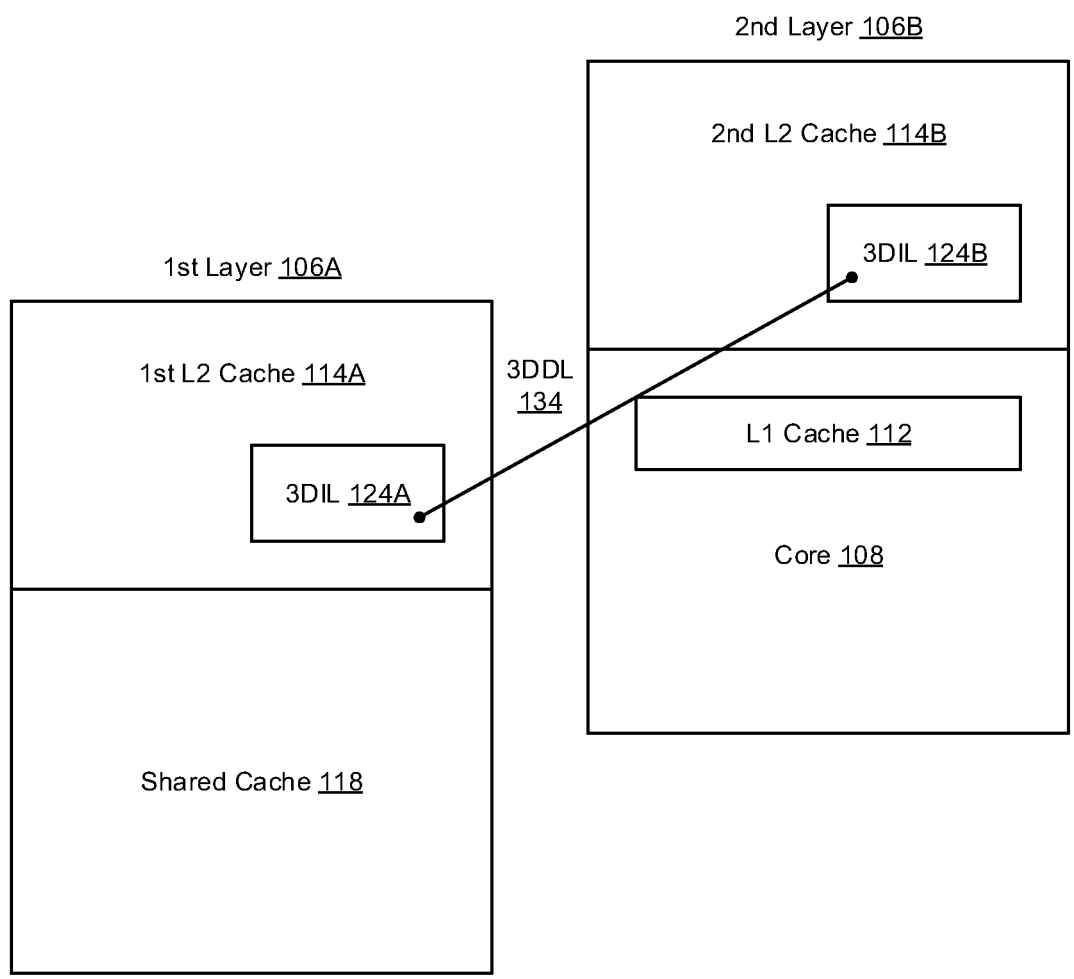
Figure 1C:
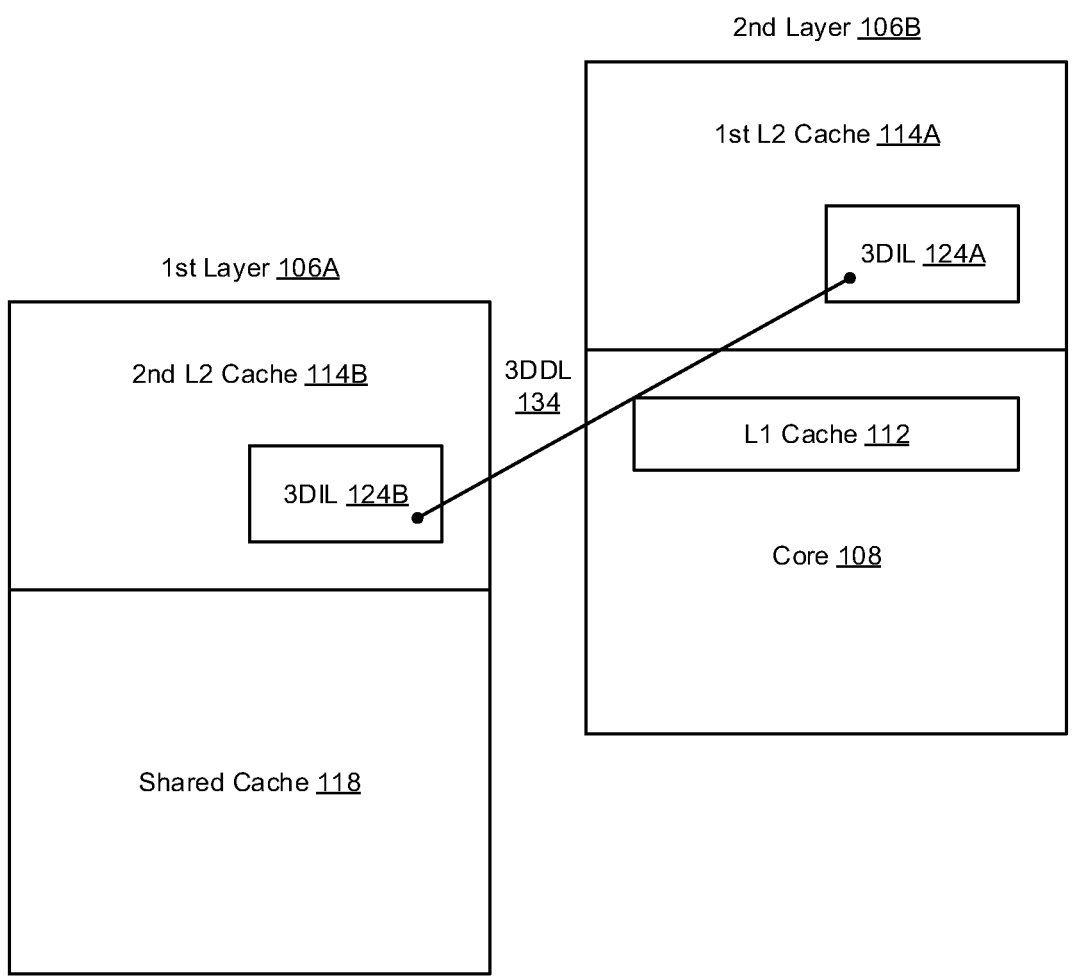

FIGS. 1A-1C illustrate various diagrams of multi-dimensional cache architecture in accordance with various implementations described herein. In particular, FIG. 1A shows a diagram 100A of multi-dimensional cache architecture 104A with a multi-layered structure, FIG. 1B shows a diagram 100B of multi-dimensional cache architecture 104B with another multi-layered structure, and FIG. 1C shows a diagram 100C of multi-dimensional cache architecture 104C with another multi-layered structure.

In various implementations, the multi-dimensional (3D) cache architecture may be implemented as a system or a device having various integrated circuit (IC) components that are arranged and coupled together as an assemblage or a combination of parts that provide for physical circuit designs and related structures. In some instances, a method of designing, providing, fabricating and/or manufacturing the multi-dimensional cache architecture as an integrated system or device may involve use of various IC circuit components described herein so as to implement various related fabrication schemes and techniques associated therewith. Also, the multi-dimensional cache architecture may be integrated with computing circuitry and components on a single chip, and the multi-dimensional cache architecture may be implemented in various embedded systems for automotive, electronic, mobile, server and also Internet-of-things (IoT) applications, including remote sensor nodes.

As shown in FIG. 1A, the multi-dimensional cache architecture 104A may refer to a multi-layered logic structure with multiple layers including a first layer 106A and a second layer 106B arranged vertically in a stacked configuration. The multi-layered logic structure may have a first cache memory 114A with first interconnect logic 124A, and the multi-layered logic structure may have a second cache memory 114B with second interconnect logic 124B that is linked to the first interconnect logic 124A in the first layer 106A with a 3D data link 134 (3DDL). The first cache memory 114A may refer to a first L2 cache memory, and the second cache memory 114B may refer to a second L2 cache memory. Also, in some instances, the multiple cache memories 114A, 114B may refer to split portions of L2 cache memory such that the first L2 cache memory 114A refers to a first portion of the L2 cache memory and the second L2 cache memory 114B refers to a second portion of the L2 cache memory. Further, the first interconnect logic 124A may refer to first 3D interconnect logic (3DIL), and the second interconnect logic 124B may refer to second 3D interconnect logic (3DIL).

In various implementations, the 3D data link 134 (3DDL) may be referred to as an inter-layer data link that vertically couples the multiple layers 106A, 106B together including coupling the first L2 cache memory 114A to the second L2 cache memory 114B. Also, the first interconnect logic (3DIL) 124A may be linked to the second interconnect logic (3DIL) 124B by way of the inter-layer data link 134 that vertically couples the first L2 cache memory 114A to the second L2 cache memory 114B in the multi-layered logic structure.

In some implementations, the cache architecture 104A may have core processing logic (Core) 108 that is disposed in at least one of the multiple layers, such as, e.g., disposed in the first layer 106A. Also, in some instances, the core processing logic (Core) 108 may be configured to interface with multiple cache memories 114A, 114B including the first L2 cache memory 114A and the second L2 cache memory 114B. Also, in some instances, the core processing logic (Core) 108 may have L1 cache memory 112, which is configured to interface with the core processing logic (Core) 108 and the multiple cache memories including the first L2 cache memory 114A and the second L2 cache memory 114B.

In some implementations, the cache architecture 104A may include shared cache memory 118 that is disposed in at least one of the multiple layers, such as e.g., disposed in the second layer 106B. Also, in some instances, the shared cache memory 118 is configured to interface with the core processing logic 108 and the multiple cache memories including the first L2 cache memory 114A and the second L2 cache memory 114B.

In various implementations, the first L2 cache memory 114A and the second L2 cache memory 114B may be linked without 3D interconnect logic (3DIL) 124A being directly linked. Thus, the multiple layers 106A, 106B may not be directly linked, and each layer 106A, 106B may have a separate logic system on each layer 106A, 106B.

In some implementations, in reference to FIG. 1A, the 3D L2 design of the cache architecture 104A may include interfaces to a 3D NoC in each layer 106A, 106B. The halves of the L2 cache may be labelled odd/even so as to denote them as interleaved based on at least bit in the address space, wherein this compute element design may be provided as a building block for distributing request traffic across multiple layers in a multi-layered system design. Various 3D bonding techniques provide for low latency connections between layers, and low latency connections allow for 3D L2 cache implementations to outperform 2D. Also, chip designers may prioritize increased capacity or lower latency in these implementations, and extending 3D L2 implementations to use separate NoC interfaces, additional 3D benefits may also ne achieved by scaling NoC injection and bi-section bandwidth in 3D. Further, this technique may be integrated into full system design by providing processing core logic in one layer while providing shared cache (SLC, HNF) above the processing core logic.

For instance, in some implementations, FIG. 1A along with FIG. 1B-1C shows how 3D logic structures with this type of organization may appear. The shared cache 118 (or SLC/HNF slice) may be implemented above/below the processing core logic 108 so that computational logic is stacked with cache memory, which may avoid thermal issues inherent to compute-on-compute 3D stacking. In some instances, the shared cache 118 may have a separate communication interface to the NoC, potentially to the same NoC router as the L2 cache in its layer. With this building block, requestors may be distributed in this 3D system across multiple layers, but the home node elements may be disposed in a single layer. Also, in some instances, responding elements may be distributed across multiple layers so as to take advantage of the 3D NoC. Further, in some instances, shared cache memories may be distributed in a 3D structure with alternating tiles such that half of the SLC/HNF slices are in one layer and half of SLC/HNF slices are in another layer.

FIG. 1B shows diagram 100B of the multi-dimensional cache architecture 104B with a multi-layered structure, wherein similar elements share similar behaviors, features and characteristics as with the multi-dimensional cache architecture 104A in FIG. 1A.

As shown in FIG. 1B, the cache architecture 104B may provide for an alternative multi-layered structure, wherein the first layer 106A includes the first L2 cache memory 114A and the shared cache memory 118, and wherein the second layer 106B includes the second L2 cache memory 114B and the core processing logic (Core) 108 with the L1 cache memory 112. Also, in some instances, the 3D data link 134 (3DDL) may provide an inter-layer data link that vertically couples the multiple layers 106A, 106B together including coupling the first L2 cache memory 114A to the second L2 cache memory 114B. Thus, the first interconnect logic (3DIL) 124A may be linked to the second interconnect logic (3DIL) 124B by way of the inter-layer data link 134 that vertically couples the first L2 cache memory 114A to the second L2 cache memory 114B in the multi-layered logic structure shown in FIG. 1B.

FIG. 1C shows diagram 100C of the multi-dimensional cache architecture 104C with a multi-layered structure, wherein similar elements share similar behaviors, features and characteristics as with the cache architectures 104A, 104B in FIGS. 1A-1B.

As shown in FIG. 1C, the cache architecture 104C may provide for an alternative multi-layered structure, wherein the first layer 106A has the second L2 cache memory 114B and the shared cache memory 118, and wherein the second layer 106B has the first L2 cache memory 114A and core processing logic (Core) 108 with the L1 cache memory 112. Also, in some instances, 3D data link 134 (3DDL) may provide an inter-layer data link that vertically couples the multiple layers 106A, 106B together including coupling the first L2 cache memory 114A to the second L2 cache memory 114B. Thus, the first interconnect logic (3DIL) 124A may be linked to the second interconnect logic (3DIL) 124B by way of the inter-layer data link 134 that vertically couples the first L2 cache memory 114A to the second L2 cache memory 114B in the multi-layered logic structure shown in FIG. 1C.

Figure 2:
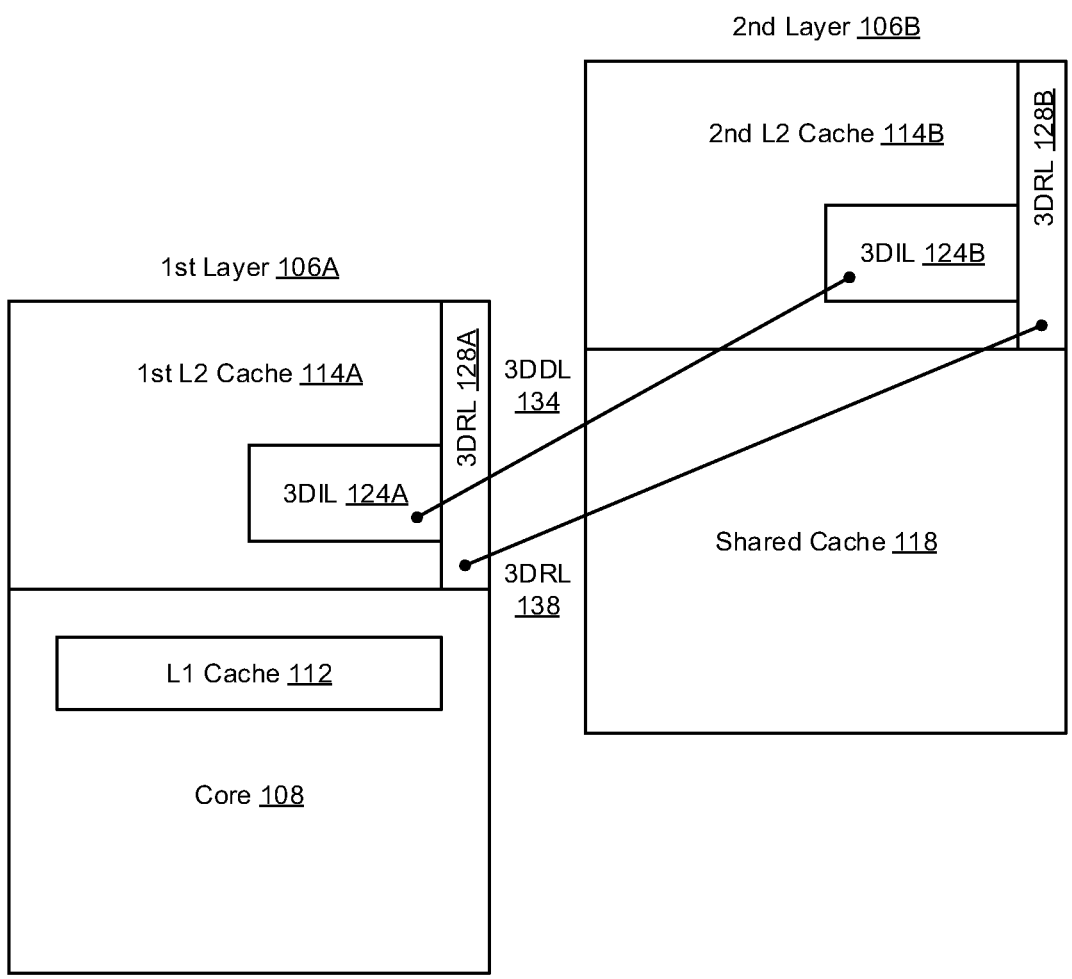
FIGS. 2-3 illustrate diagrams of multi-dimensional cache architecture with multi-level cache circuitry in accordance with implementations described herein.

FIG. 2 illustrates a diagram 200 of multi-dimensional cache architecture 204 with multi-level cache circuitry in accordance with implementations described herein. In various implementations, the cache architecture 204 shares similar elements with similar behaviors, features and characteristics as the cache architectures 104A-104C in FIGS. 1A-1C.

As shown in FIG. 2, the cache architecture 204 may provide for an alternative multi-layered structure, wherein the first layer 106A has the first L2 cache memory 114A with first 3D router logic (3DRL) 128A, and wherein the second layer 106B includes the second L2 cache memory 114B with second 3D router logic (3DRL) 128B. Also, the first layer 106A includes the core processing logic (Core) 108 and the L1 cache memory 112, and the second layer 106B has the second L2 cache memory 114B and the shared cache memory 118. Also, in some instances, 3D data link 134 (3DDL) may provide an inter-layer data link that vertically couples the multiple layers 106A, 106B together including coupling the first L2 cache memory 114A to the second L2 cache memory 114B. Thus, the first interconnect logic (3DIL) 124A may be linked to the second interconnect logic (3DIL) 124B by way of the inter-layer data link 134 that vertically couples the first L2 cache memory 114A to the second L2 cache memory 114B in the multi-layered logic structure shown in FIG. 1C.

Also, in some implementations, the cache architecture 204 may provide for a multi-dimensional data routing network with multiple routers (3DRL) 128A, 128B disposed in each layer of the multiple layers 106A, 106B. For instance, the first 3D router logic (3DRL) 128A may be disposed in the first layer 106A and the second 3D router logic (3DRL) 128B may be disposed in the second layer 106B that is linked to the first 3D router logic (3DRL) 128A by way of a 3D router link (3DRL) 138. Thus, the multi-dimensional data routing network may have at least one 3D data path that vertically couple the multiple routers 128A, 128B together including the first 3D router logic 128A to the second 3D router logic 128B.

Figure 3:
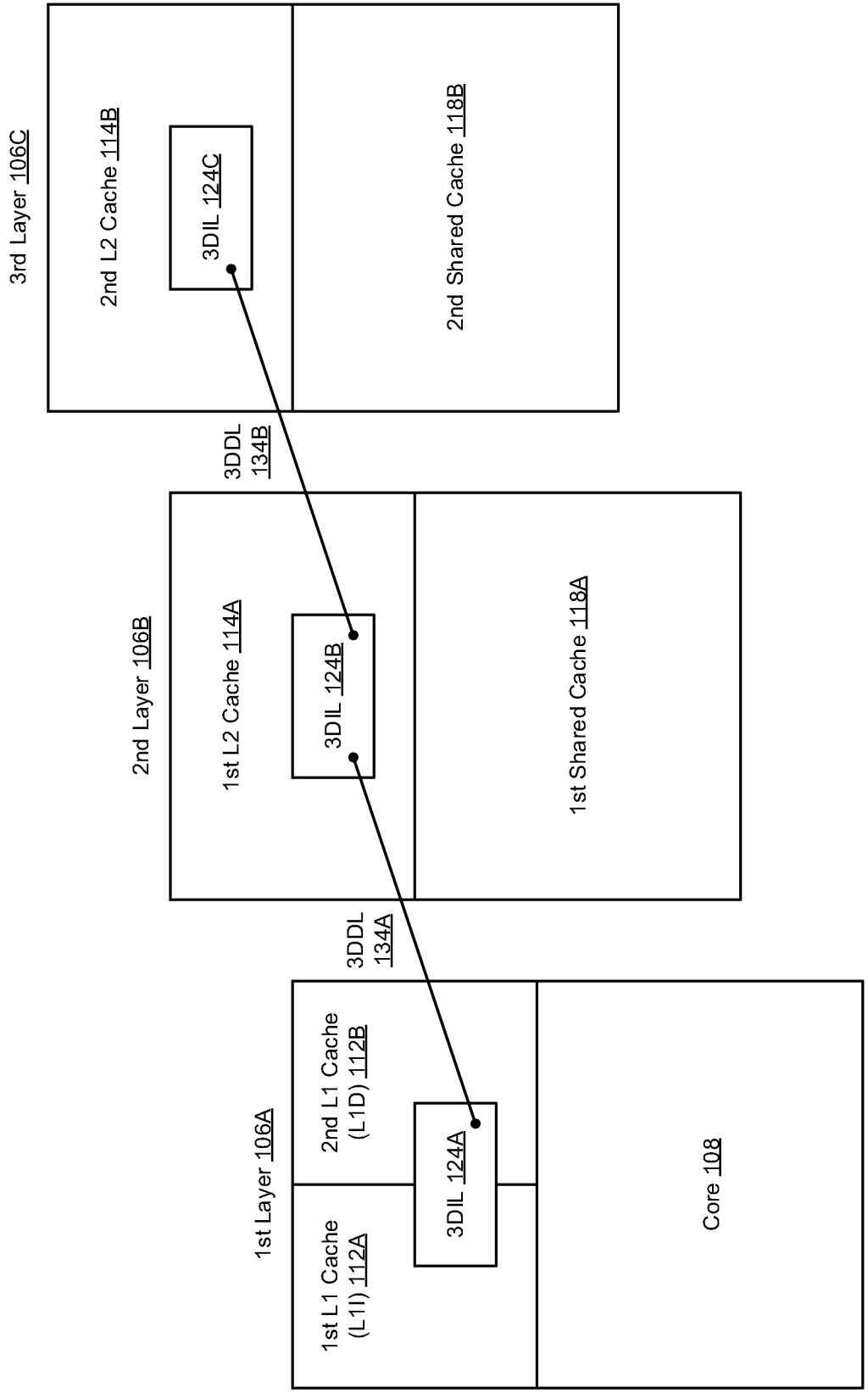

FIG. 3 illustrates a diagram 300 of multi-dimensional cache architecture 304 with multi-level cache circuitry in accordance with implementations described herein. In various implementations, the cache architecture 304 shares similar elements with similar behaviors, features and characteristics as the cache architecture 204 shown in FIG. 2.

As shown in FIG. 3, the multi-dimensional cache architecture 304 may refer to a multi-layered logic structure having multiple layers 106A, 106B, 106C arranged vertically in a stacked configuration. The multi-layered logic structure may include core processing logic 108 disposed in a first layer 106A of the multiple layers, and the multi-layered logic structure may include a cache memory split into multiple portions 114A, 114B linked together with an inter-layer data link (3DDL) 134B. In some instances, the core processing logic 108 may be coupled to a first portion 114A of the L2 cache memory by way of a first inter-layer data link (3DDL) 134A, and the multiple portions 114A, 114B of the L2 cache memory may be linked together with a second inter-layer data link (3DDL) 134B. The first portion 114 of L2 cache memory may be disposed in a second layer 106B, and the second portion 114B of L2 cache memory may be disposed in a third layer 106C of the multiple layers.

In some implementations, the first layer 106A may also include multiple L1 cache memories, such as, e.g., a first L1 cache memory (L1I) 112A and a second L1 cache memory (L1 D) 112B, that are configured to interface with the core processing logic 108. Also, in some instances, the first layer 106A may include first 3D interconnect logic (3DIL) 124A that may be coupled to the second 3D interconnect logic (3DIL) 124B. Also, the first 3DIL 124A may communicate with the third 3DIL 124C by way of the second 3DIL 124B.

Therefore, in various implementations, the multiple layers 106A, 106B, 106C may be vertically integrated together by way of their corresponding 3DILs 124A, 124B, 124C. For instance, the first portion 114A of L2 cache memory uses the second 3DIL 124B that is linked to the processing core logic 108 disposed in the first layer 106A by way of the first 3DIL 124A, and also, the second portion 114B of L2 cache memory uses third 3DIL 124C that is linked to the first 3DIL 124A in the first layer 106A by way of the second 3DIL 124B in the second layer 106B. Thus, multiple inter-layer data links (3DDL) 134A, 134B may be used to vertically couple the multiple layers 106A, 106B, 106B together including the core processing logic 108 to the first portion 114A of L2 cache memory and to the second portion 114B of L2 cache memory. Also, the first 3DIL 124A may be linked to the second 3DIL 124B by way of the first inter-layer data link (3DDL) 134A that vertically couples the core processing logic 108 and the L1 caches memories 112A, 112B to the first portion 114A of L2 cache memory in the multi-layered logic structure. Also, in some instances, the second 3DIL 124B may be linked to the third 3DIL 124C by way of the second inter-layer data link (3DDL) 134B that is used to vertically couple the first portion 114A of L2 cache memory to the second portion 114B of L2 cache memory in the multi-layered logic structure.

In some implementations, the core processing logic 108 is configured to interface with the multiple portions 114A, 114B of L2 cache memory by way of the inter-layer data links (3DDLs) 134A, 134B including the first portion 114A of L2 cache memory and the second portion 114B of L2 cache memory. Also, in some instances, the cache architecture 304 may have one or more shared cache memories 118A, 118B that are disposed in one or more of the multiple layers, such as, e.g., a first shared cache memory 118A disposed in the second layer 106B and a second shared cache memory 118B disposed in the third layer 106C. Also, the one or more shared cache memories 118A, 118B may be configured to interface with the core processing logic 108 in the first layer 106A and each portion of L2 cache memory 114A, 114B including the first portion 114A of L2 cache memory in the second layer 106B and the second portion 114B of L2 cache memory in the third layer 106C.

In some implementations, each the shared cache memory 118A, 118B interfaces directly with the corresponding portion 114A, 114B of L2 cache memory in its own layer. Any interactions with the processing logic 108 and other portions of L1 cache memory 112A, 112B may pass through the inter-layer data link (3DDL) 134A, 134B that couples to each portion of the split L2 cache memory 114A, 114B. As such, the shared cache memories 118A, 118B is only coupled directly to their corresponding portions 114A, 114B of L2 cache memory in the same layer. In some instances, the shared cache memories 114A, 114B may be coupled through the network links (3DDLs) 134A, 134B to each portion 114A, 114B of private or local L2 cache memory 114A, 114B. Thus, the shared cache memories 118A, 118B may network directly with their corresponding portions 114A, 114B of L2 cache in the same layer.

In some implementations, in reference to FIG. 3, the 3D structural organization may provide for a two-layer implementation of a system tile that includes L2 cache memory for each processing core, wherein the L2 cache memory is split between the multiple layers so as to expand L2 cache capacity and NoC bandwidth. In some instances, the homogenous cache layers may be designed and manufactured in a generalized way, such that only one die may operate for any cache layer. This may provide an expandability benefit wherein the cache capacity and NoC bandwidth may be configured at assembly time to support multiple different system configurations that target specific costs and/or performance.

Figure 4A:
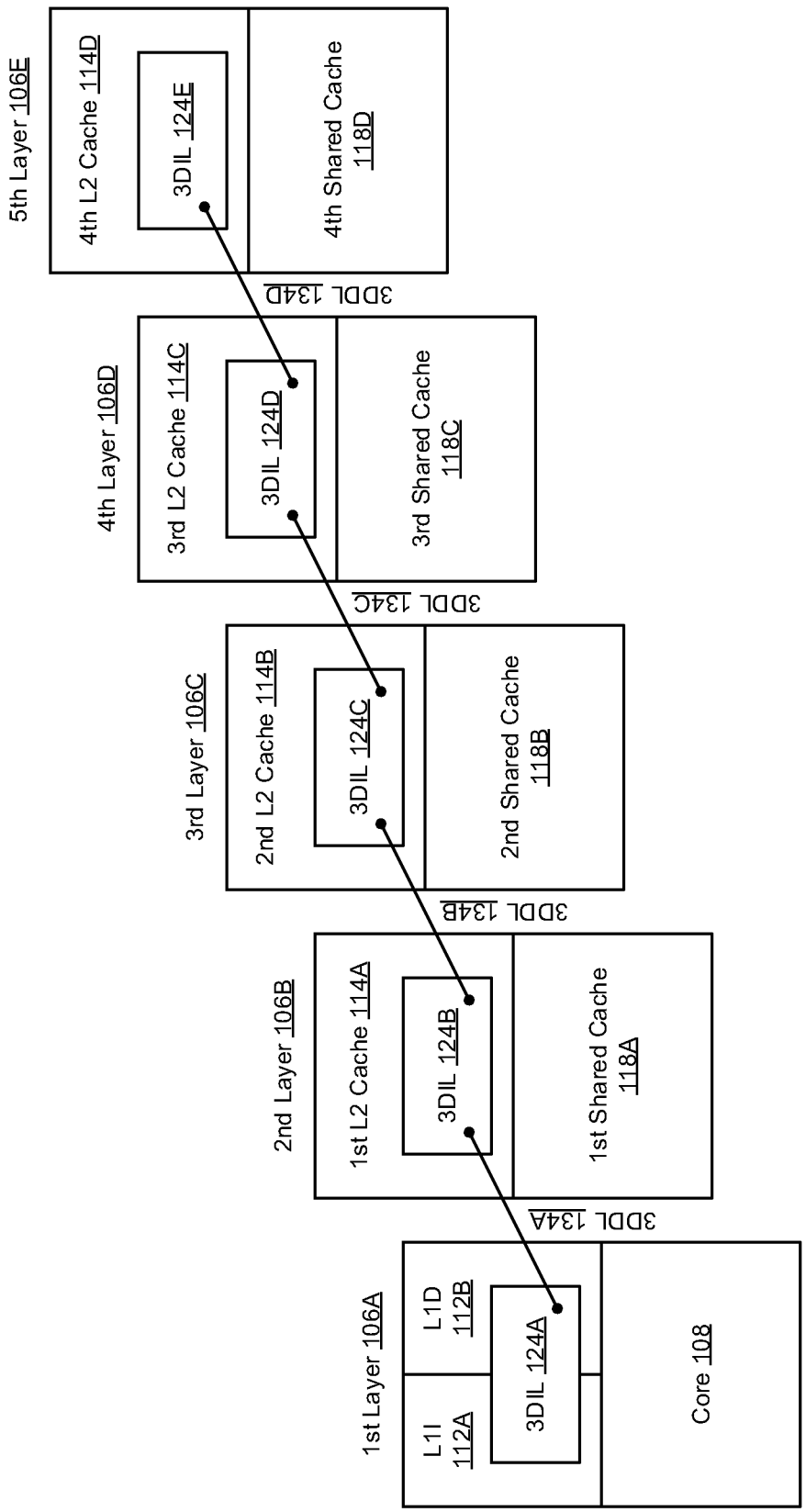
FIGS. 4A-4B illustrate various diagrams of multi-dimensional cache architecture with multi-level cache circuitry in accordance with implementations described herein.
Figure 4B:
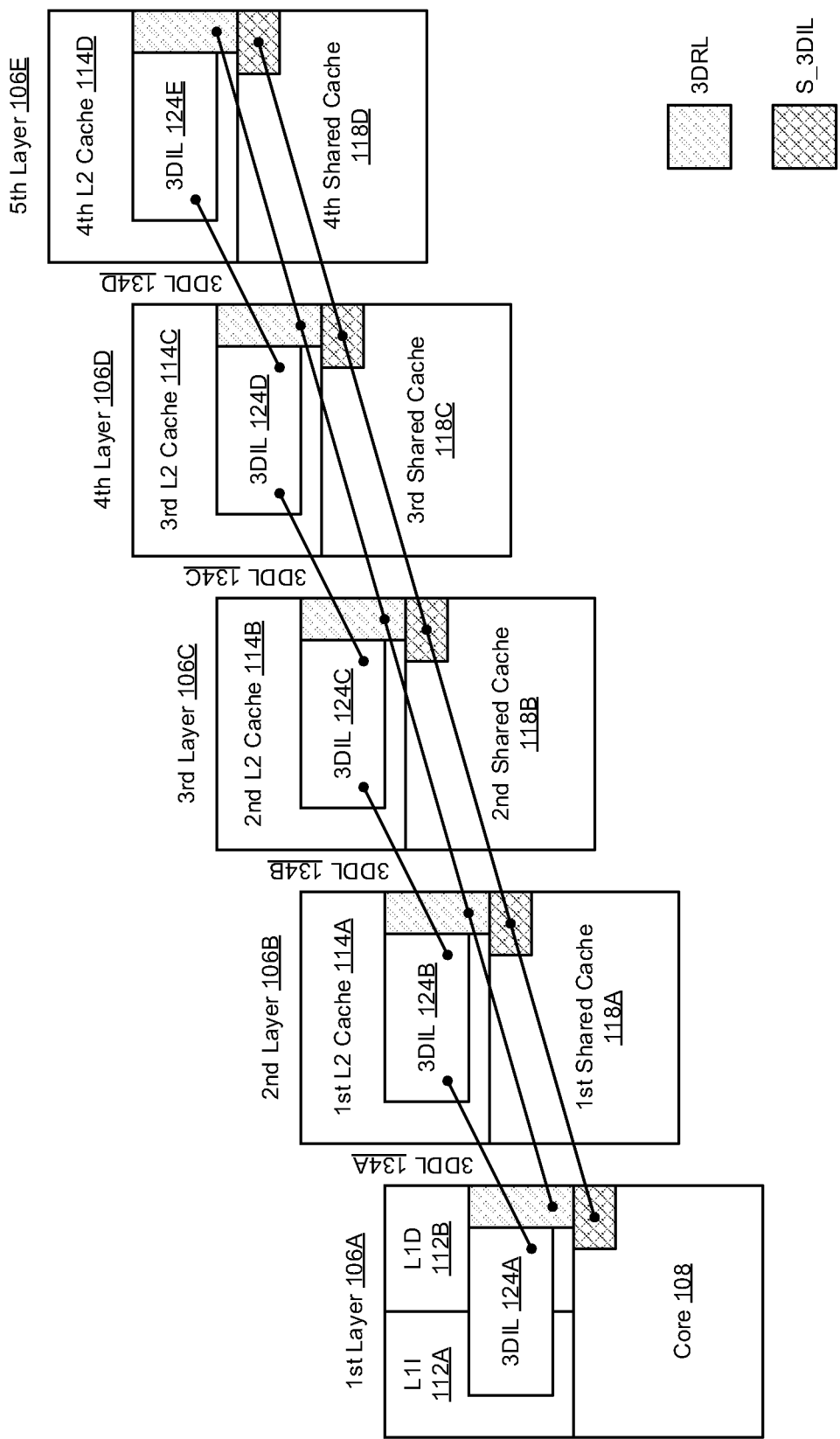

FIGS. 4A-4B illustrate various diagrams of multi-dimensional cache architecture with multi-level cache circuitry and data network in accordance with various implementations described herein. In particular, FIG. 4A shows a diagram 400A of multi-dimensional cache architecture 404A with multi-level cache circuitry and data network, and FIG. 4B shows a diagram 400B of multi-dimensional cache architecture 404B with multi-level cache circuitry and data network. In various implementations, the cache architectures 404A, 404B share similar elements and components along with similar behaviors, features and characteristics as the cache architectures 204, 304 shown in FIGS. 2-3.

As shown in FIG. 4A, the multi-dimensional cache architecture 404A may refer to a multi-layered logic structure having multiple layers 106A, 106B, 106C, 106D, 106E that are arranged vertically in a multi-level stacked configuration. In various instances, the multi-layered logic structure may include core processing logic 108 disposed in a first layer 106A of the multiple layers, and the multi-layered logic structure may include a cache memory split into multiple portions 114A, 114B, 114C, 114D linked together with multiple inter-layer data links (3DDL) 134A, 134B, 134C, 134D. In some instances, the core processing logic 108 may be coupled to a first portion 114A of L2 cache memory by way of a first inter-layer data link (3DDL) 134A, and the multiple portions 114A, 114B, 114C, 114D of L2 cache memory may be linked together with their corresponding inter-layer data links (3DDL) 134B, 134C, 134D. Also, the first portion 114 of L2 cache memory may be disposed in the second layer 106B, and additional portions 114B, 114C, 114D of the L2 cache memory may be disposed in corresponding layers 106C, 106D, 106E of the multiple layers.

In some implementations, the first layer 106A may also include multiple L1 cache memories, such as, e.g., a first L1 cache memory (L1I) 112A and a second L1 cache memory (L1 D) 112B, that are configured to interface with the core processing logic 108. Also, in some instances, the first layer 106A may include first 3DIL 124A that may be coupled to the second 3DIL 124B. Also, in some instances, the first 3DIL 124A may further communicate with the additional 3DILs 124C, 124D, 124E by way of the second 3DIL 124B.

As such, in various implementations, the multiple layers 106A, 106B, 106C, 106D, 106E may be vertically integrated together by way of their corresponding 3DILs 124A, 124B, 124C, 124D, 124E. For instance, the first portion 114A of L2 cache memory uses the second 3DIL 124B that is linked to the processing core logic 108 disposed in the first layer 106A by way of the first 3DIL 124A, and also, the second portion 114B of L2 cache memory uses third 3DIL 124C that is linked to the first 3DIL 124A in the first layer 106A by way of the second 3DIL 124B in the second layer 106B. Also, the third portion 114C of L2 cache memory uses the fourth 3DIL 124D that is linked to the processing core logic 108 disposed in the first layer 106A by way of the first-to-third 3DILs 124A-124C, and also, the fourth portion 114D of L2 cache memory uses fifth 3DIL 124E that is linked to the first 3DIL 124A in the first layer 106A by way of the first-to-fourth 3DILs 124A-124D in corresponding layers 106A-106D.

Thus, multiple inter-layer data links (3DDL) 134A-134D may be used to vertically couple the multiple layers 106A-106E together including the core processing logic 108 to the first-to-fourth portions 114A-114D of L2 cache memory. Further, the first 3DIL 124A may be linked to the second 3DIL 124B by way of the first inter-layer data link (3DDL) 134A that vertically couples the core processing logic 108 and the L1 caches memories 112A, 112B to the first portion 114A of L2 cache memory in the multi-layered logic structure. Also, in some instances, the second-to-fifth 3DILs 124B-124E may be linked together by way of the second-to-fourth inter-layer data links (3DDL) 134B-134D that is used to vertically couple the first-to-fourth portions 114A-114D of the L2 cache memory in the multi-layered logic structure.

In some implementations, the multiple layers 106B-106E may have corresponding shared cache memories 118A-118D. For instance, the second layer 106B may have a first shared cache memory 118A, and the third layer 106C may have a second shared cache memory 118B. Also, in some instances, the fourth layer 106D may have a third shared cache memory 118C, and the fifth layer 106E may have a fourth shared cache memory 118D.

In some implementations, in reference to FIG. 4A, the 3D structural organization may provide for an expandable design having an arbitrary number of cache layers, such as, e.g., four cache layers 106B-106E. In this instance, the address space may be split based on two-bits so as to enable four separate address spaces that correspond to the four cache layers. Also, address space separation may allow for 3D interconnect logic to have multiple 2D meshes in each layer, wherein the only 3D interface occurs between the L1 caches and L2 nodes of each cache layer. Also, SLC/HNF nodes on each layer may correspond to the address space in that layer, and the expandable L2 design may include increased tracking capacity. As such, in this instance, chips may be designed to support an arbitrary number of cache layers while leveraging 3D design so as to expand cache capacity and interconnect bandwidth simultaneously using only 2D mesh interconnect logic. The latency of face-to-back bonded interconnections may increase L2 access latency; however, any performance penalty from this latency increase may be at least partially offset by successive doubling in L2 cache capacity as cache layers double. As manufacturing technology matures and dies become thinner, these 3D type interface interconnections may experience lower latency, and further, L2 access latency may decrease so as to improve performance.

As shown in FIG. 4B, the multi-dimensional cache architecture 404B may refer to a multi-layered logic structure with multiple layers 106A-106E that are arranged vertically in a multi-level stacked configuration. In various instances, the multi-layered logic structure may include core processing logic 108 disposed in the first layer 106A of the multiple layers, and the multi-layered logic structure may include a cache memory split into multiple portions 114A-114D linked together with multiple inter-layer data links (3DDL) 134A-134D. In some instances, the core processing logic 108 may be coupled to the first portion 114A of L2 cache memory by way of the first inter-layer data link (3DDL) 134A, and the multiple portions 114A-114D of L2 cache memory may be linked together with their corresponding inter-layer data links (3DDL) 134B-134D. Further, the first portion 114 of L2 cache memory may be disposed in the second layer 106B, and additional portions 114B-114D of the L2 cache memory may be disposed in corresponding layers 106C-106E of the multiple layers.

In some implementations, the multi-dimensional cache architecture 404B includes a multi-dimensional data routing network (3DRL) with multiple routers disposed in each layer of the multiple layers 106A-106E. For instance, the first layer 106A may include a first router (3DRL), and the second layer 106B may include a second router (3DRL) that is linked to the first router (3DRL). The third layer 106C may have a third router (3DRL) that is linked to the first and second routers (3DRL), and the fourth layer 106D may include a fourth router (3DRL) that is linked to the first-to-third routers (3DRL). The fifth layer 106E may have a fifth router (3DRL) that is linked to the first-to-fourth routers (3DRL). Also, in some instances, the multi-dimensional data routing network may include network data paths that vertically couple the multiple routers (3DRL) together including the first-to-fifth routers (3DRL).

In some implementations, the multi-dimensional cache architecture 404B includes the portions 114A-114B of L2 cache memory disposed in the layers 106B-106C along with one or more additional portions 114C-114D of L2 cache memory disposed in one or more additional layers 106D-106E of the multiple layers. Also, the one or more additional portions 114C-114D of L2 cache memory may be linked to the first and second portion 114A-114B of cache memories by way of the inter-layer data links (3DDL) 134B-134D. In some instances, the multi-dimensional cache architecture 404B may include a shared multi-dimensional 3DIL (S_3DIL) that may be used to interconnect the processing core logic 108 to the shared cache memories 118A-118D in the multi-layered logic structure.

Figure 5:
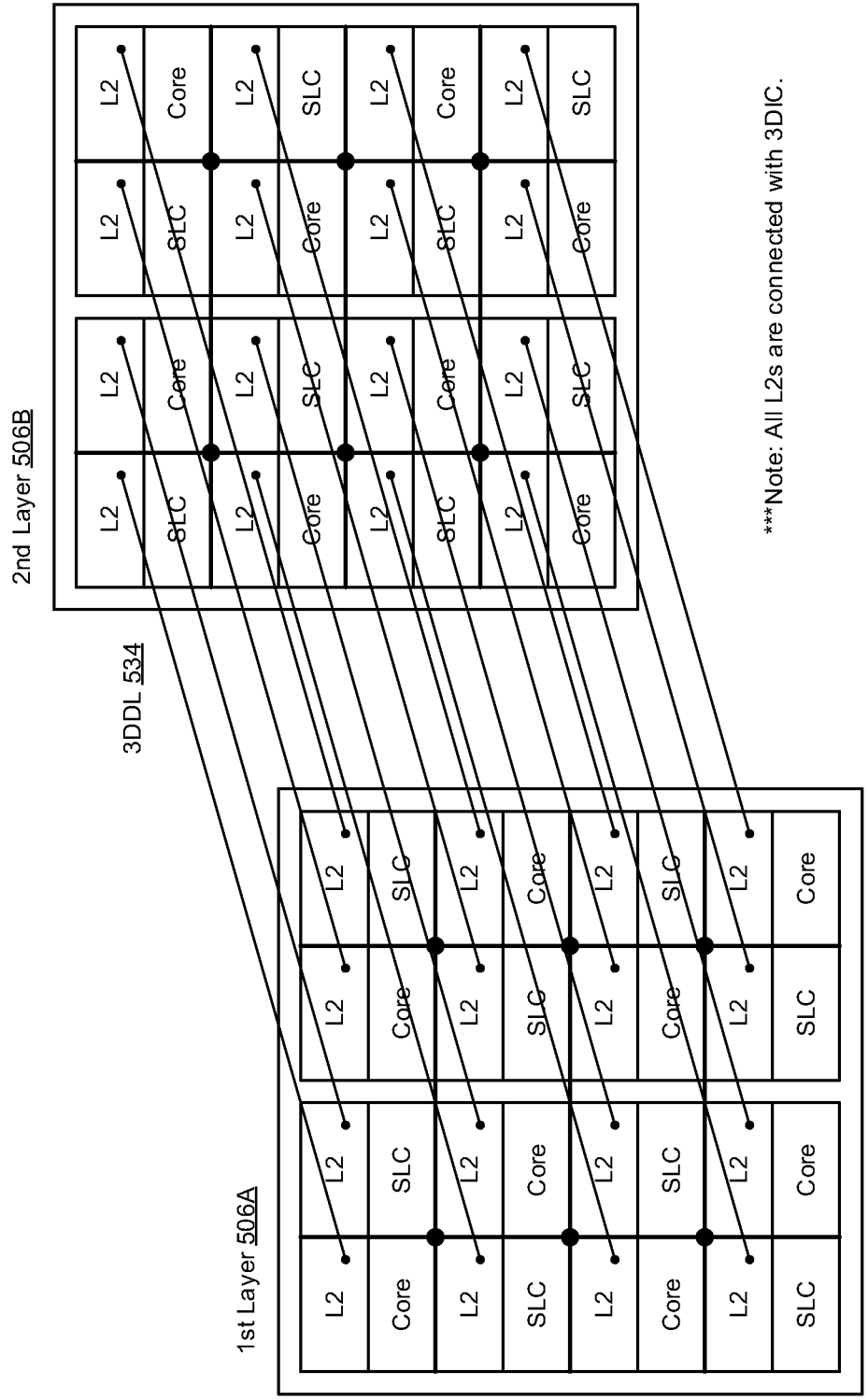
FIGS. 5-8 illustrate diagrams of multi-dimensional cache architecture with multi-level cache circuitry in accordance with implementations described herein.
Figure 6:
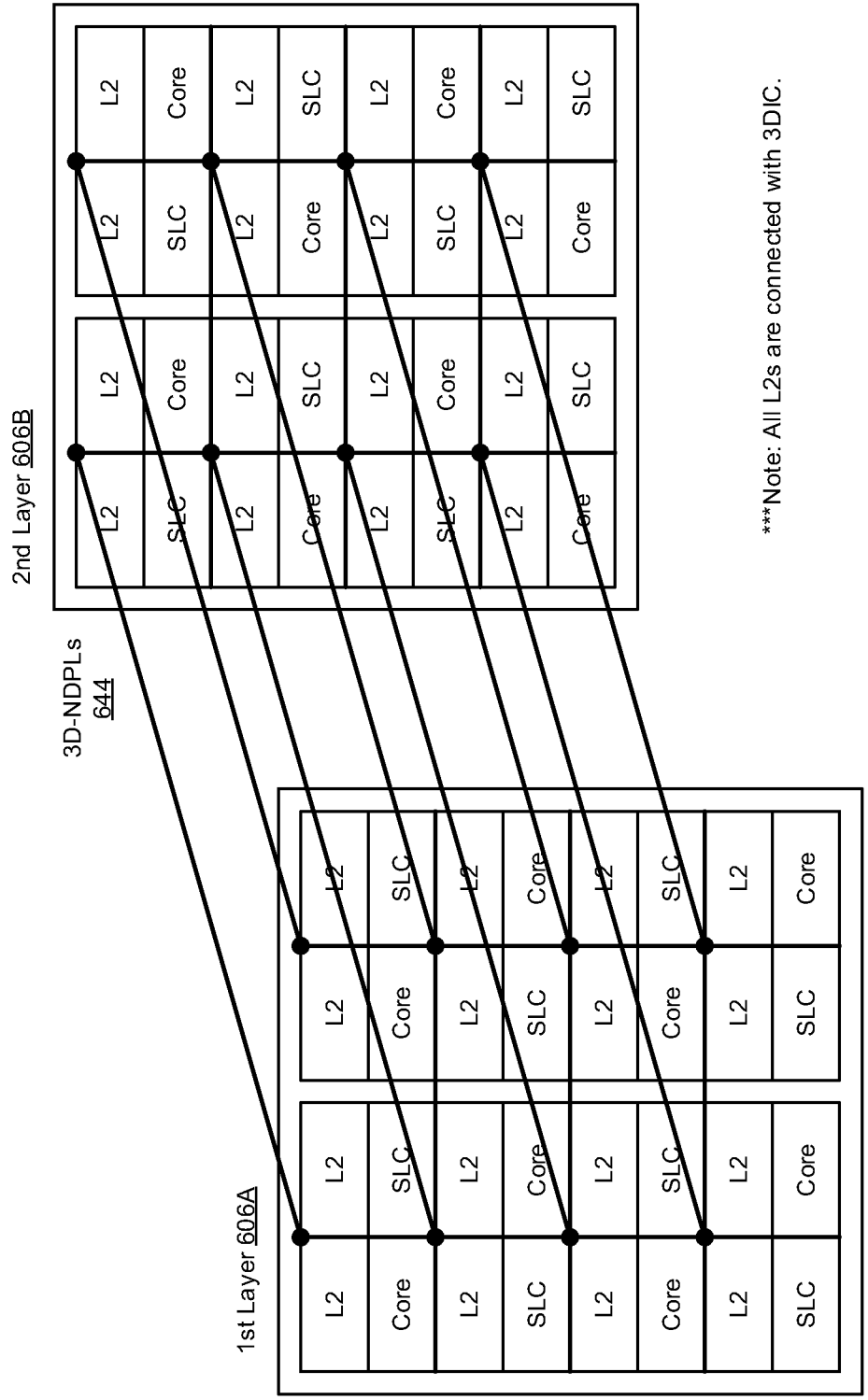
Figure 7:
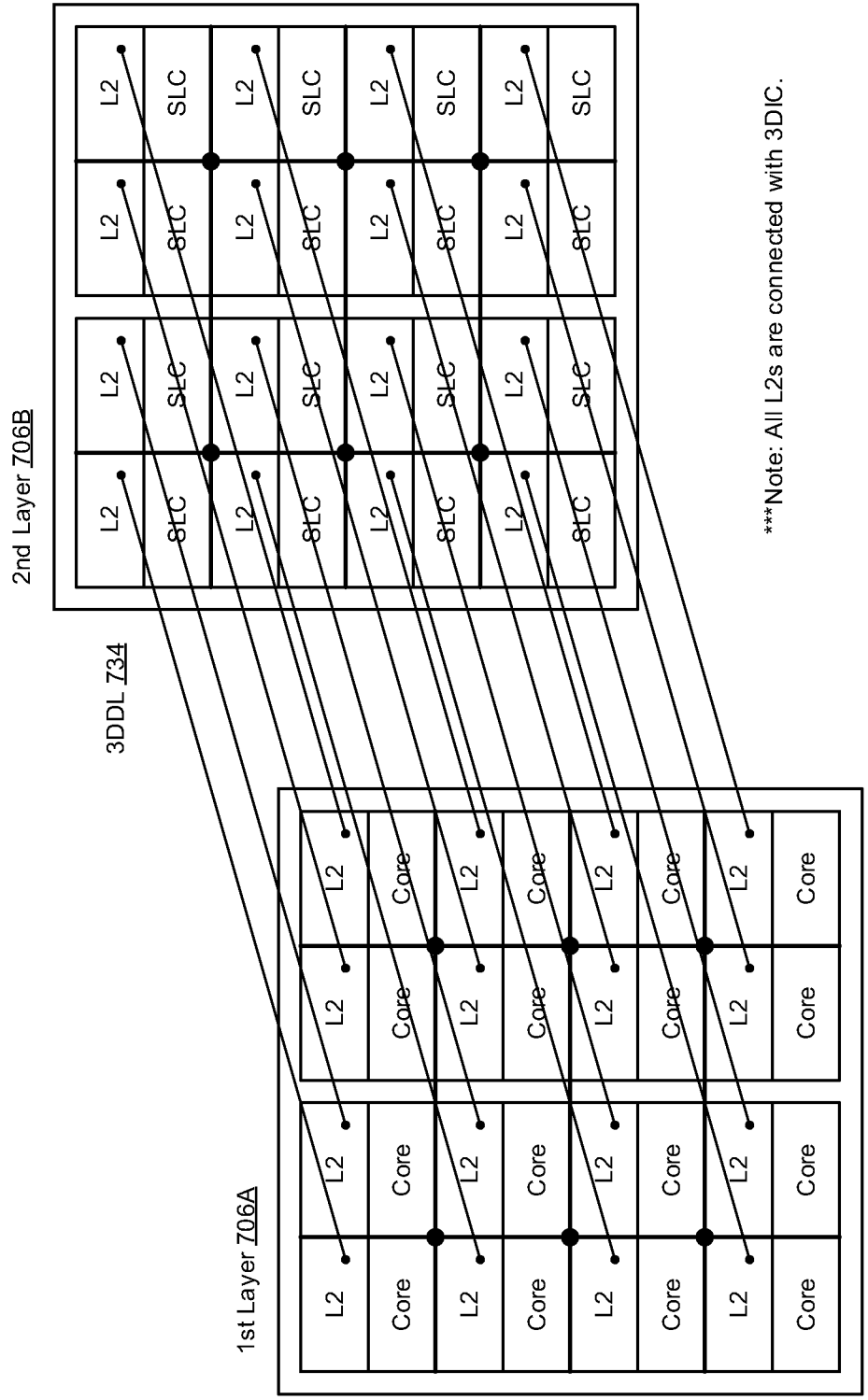
Figure 8:
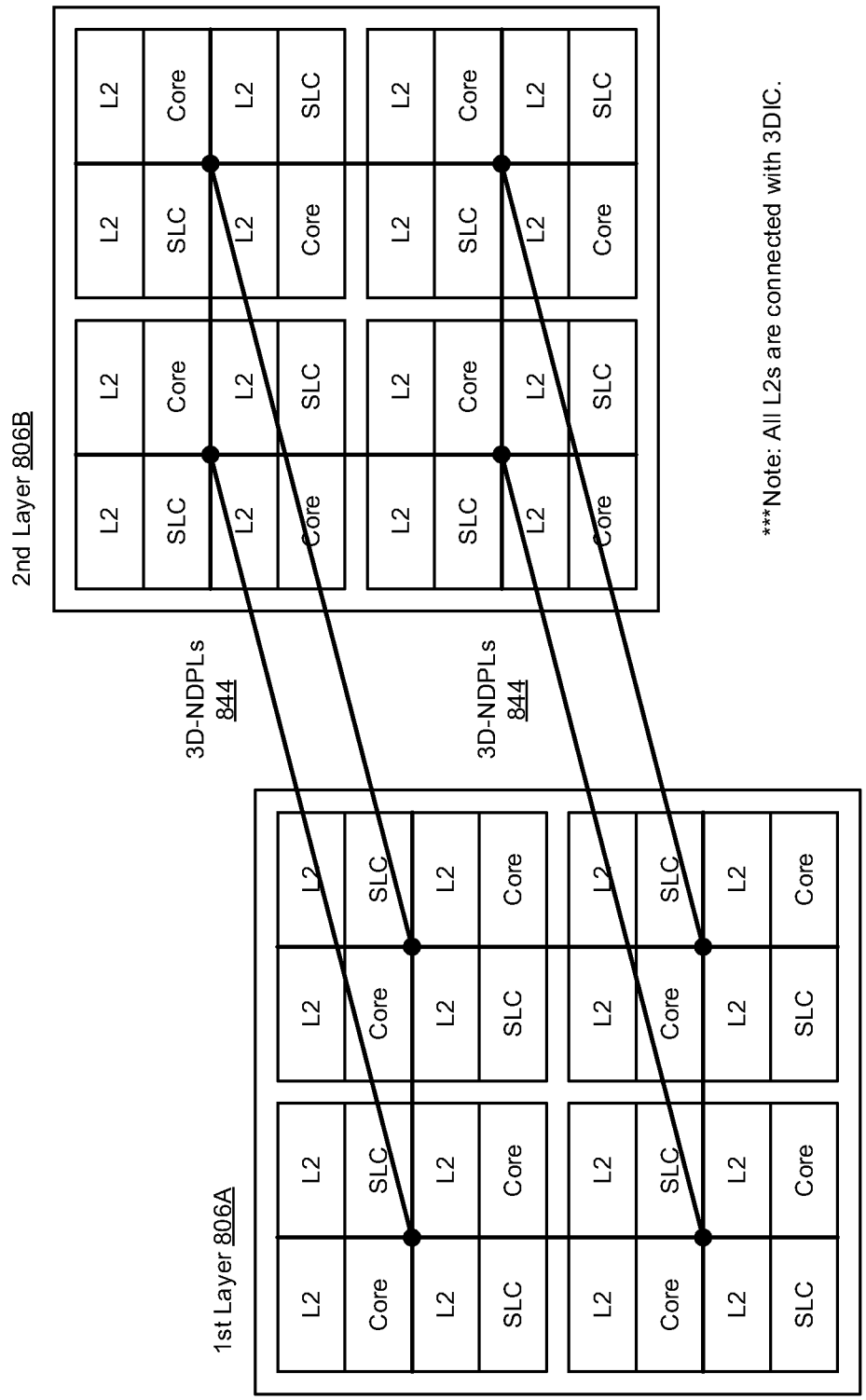

FIGS. 5-8 illustrate diagrams of multi-dimensional cache architecture with multi-level cache circuitry along with a coherent mesh network in accordance with implementations described herein. In particular, FIG. 5 shows a diagram 500 of multi-dimensional cache architecture 504, FIG. 6 shows a diagram 600 of multi-dimensional cache architecture 604, FIG. 7 shows a diagram 700 of multi-dimensional cache architecture 704, and FIG. 8 shows a diagram 800 of multi-dimensional cache architecture 804. In various instances, the cache architectures may share similar elements along with similar behaviors, features and characteristics as the cache architectures 104A-400B in FIGS. 1A-4B.

As shown in FIG. 5, the multi-dimensional cache architecture 504 may provide for a multi-layered logic structure with multiple layers including a first layer 506A and a second layer 506B arranged vertically in a stacked configuration. The cache architecture 504 may include an inter-layer data routing network having 3D interconnect logic (3DIL) 534 in each layer of the multiple layers including first 3D interconnect logic (3DIL) in the first layer 506A and second 3D interconnect logic (3DIL) in the second layer 506B that is linked to the first 3D interconnect logic (3DIL). In some instances, as shown in FIG. 5A, all the L2 cache memories may be linked together with 3DILs and/or 3D data links (3DDL) 534 that are disposed between the multiple layers including between the first layer 506A and the second layer 506B.

In some implementations, the first layer 506A has multiple groups of components, wherein each logic block may have processing core logic (Core), shared cache logic (SLC), and split L2 cache memory (L2). As such, the first logic blocks may be disposed in the first layer 506A, wherein each first logic block includes a first 3DIL along with first core processing logic, first L2 cache memory and first shared cache memory. Similarly, in some instances, the second layer 506B has multiple groups of components, wherein each logic block may include processing core logic (Core), shared cache logic (SLC), and split L2 cache memory (L2). As such, the second logic blocks may be disposed in the second layer 506B, wherein each second logic block includes a second 3DIL along with second core processing logic, second L2 cache memory and second shared cache memory.

In various implementations, the 3D interconnect logic (3DIL) in each layer 506A, 506B of the multiple layers refers to L2 cache memory with inter-layer data links that vertically couple the multiple layers together including the first 3D interconnect logic (3DIL) in the first layer 506A to the second 3D interconnect logic (3DIL) in the second layer 506B. Further, in some instances, the first 3DIL is linked to the second interconnect logic 3DIL by way of 3D inter-layer data paths that vertically couple the first L2 cache memories in the first layer 506A to the second L2 cache memories in the second layer 506B of the multi-layered logic structure.

In some implementations, in reference to FIG. 5, the 3D structural organization may provide for a system with address space separation between multiple layers. In some instances, L2 cache storage and SLC/HNF slices on one layer may correspond to that layer's address space, wherein this may place a minor constraint on flexibility of the SLC/HNF slice distribution that may effectively hash each address space across half of the total number of SLC/HNF slices. Also, interconnections between the multiple layers may occur in the cores' interfaces so as to the split L2 implementation, and further, memory controller interfaces in this type of system structure may have connections in both layers. Also, in some instances, this type of system organization may operate to distribute traffic between the multiple layers, thus doubling injection and bi-section bandwidth of a 2D mesh into a 3D mesh without the need for 3D interconnect logic. Moreover, this 3D technology may be used by chip designers that want to take advantage of 3D manufacturing techniques.

As shown in FIG. 6, the multi-dimensional cache architecture 604 may provide for a multi-layered logic structure with multiple layers including a first layer 606A and a second layer 606B arranged vertically in a stacked configuration. In some implementations, the first layer 606A has multiple groups of components, wherein each first logic block has processing core logic (Core), shared cache logic (SLC), and split L2 cache memory (L2). Similarly, in some instances, the second layer 606B has multiple groups of components, wherein each second logic block has processing core logic (Core), shared cache logic (SLC), and split L2 cache memory (L2). Further, in some instances, as shown in FIG. 6, interfacing between logic blocks may be handled within the L2 cache memories. In some instances, as described herein above in reference to FIG. 5A, all the L2 cache memories may be linked together with 3DILs and/or 3D data links (3DDL) that are disposed between the multiple layers including between the first layer 606A and the second layer 606B. The multi-dimensional cache architecture 604 may have an auxiliary data network that provides auxiliary network data paths, such as, e.g., 3D network data path links (3D-NDPL) 644, between nodes disposed in each layer of the multiple layers including auxiliary network data paths between first nodes disposed in the first layer and second nodes disposed in the second layer.

In some implementations, in reference to FIG. 6, the 3D structural organization may provide for L2 implementations that are split between multiple layers and correspond to neighboring cores in the Y-direction. Alternating the processing cores and SLC/HNF slices in a checkerboard pattern may enable for distribution of responding elements that may balance traffic in the 3D mesh interconnect. In some instances, this checkerboard distribution of the elements may enable uniform traffic when using dimension-order-routing (DOR), and this checkerboard organization of 3D stacking caches on processing core logic may yield better thermal characteristics than a system with separate layers of compute and cache, because compute tiles are not adjacent to each other in the X-Y dimensions. Also, in some instances, this implementation may be enhanced so as to avoid traffic in the Z-direction, wherein the L2 implementations described herein may be used to split the address space by each layer, so that this 3D NoC may be organized as two separate 2D meshes that each handle a different address space while avoiding the Z-direction in the 3D interconnect space.

As shown in FIG. 7, the multi-dimensional cache architecture 704 may provide for a multi-layered logic structure with multiple layers including a first layer 706A and a second layer 706B arranged vertically in a stacked configuration. In some implementations, the first layer 706A has multiple groups of components, wherein each first logic block has processing core logic (Core) and split L2 cache memory (L2). Similarly, in some instances, the second layer 706B has multiple groups of components, wherein each second logic block has shared cache logic (SLC) and split L2 cache memory (L2). The cache architecture 704 may include an inter-layer data routing network with 3D interconnect logic in at least one L2 cache memory in each layer of the multiple layers, wherein a first 3DIL in the first layer 706A links with a second 3DIL in the second layer 706B by way of a 3D data link (3DDL) 734. In some instances, as shown in FIG. 7, all the L2 cache memories may be linked together with 3DILs and/or 3D data links (3DDL) 734 that are disposed between the multiple layers including between the first layer 706A and the second layer 706B. Also, in some instances, the first layer 706A may have multiple first logic blocks disposed together, wherein one or more of the first logic blocks has the first 3DIL along with the first core processing logic (Core) and the first L2 cache memory (L2). Also, in some instances, the second layer 706B may have multiple second logic blocks disposed together, wherein one or more of the second logic blocks has the second 3DIL along with the shared cache memory (SLC) and the second L2 cache memory (L2).

In some implementations, in reference to FIG. 7, the 3D structural organization may provide for separate core/cache layers, wherein the checkerboard approach described herein above demonstrates that SLC/HNF ports may be distributed in multiple layers. Also, in some instances, another 3D structural organization may be used that provides for similar network injection points as those described above, but with a dedicated core implementation layer and an SLC/HNF SRAM implementation layer. FIG. 7 shows how this type of system design may be used to take advantage of interleaved 2D NoCs while having layers devoted to processing core logic and SLC/HNF implementation by having the cores on only one layer so as to simplify power distribution. In this instance, SLC/HNF logic blocks may be alternately interfaced with the NoC on the SRAM layer with the NoC on the core layer. Further, in this instance, some area on the core layer may be necessary to serve as the interface and queues for half of the SLC/HNF slices. In reference to expandable 3D structural designs, various aspects described herein may be extended to make some designs expandable to an arbitrary number of layers with face-to-back bonding technology. This embodiment extends the cache capacity and interconnect bandwidth benefits to an arbitrary number of layers while using two dies for design and production. To avoid thermal limitations of compute-on-compute, the system may have the compute layer separate from the cache layers.

As shown in FIG. 8, the multi-dimensional cache architecture 804 may provide for a multi-layered logic structure with multiple layers including a first layer 806A and a second layer 806B arranged vertically in a stacked configuration. In some implementations, the first layer 806A has multiple groups of components, wherein each first logic block has processing core logic (Core), shared cache logic (SLC), and split L2 cache memory (L2). Similarly, in some instances, the second layer 806B has multiple groups of components, wherein each second logic block has processing core logic (Core), shared cache logic (SLC), and split L2 cache memory (L2). In some instances, as described herein above in reference to FIG. 7, all the L2 cache memories may be linked together with 3DILs and/or 3D data links (3DDL) that are disposed between the multiple layers including between the first layer 806A and the second layer 806B. In addition, the multi-dimensional cache architecture 804 may have an auxiliary data network that provides auxiliary network data paths, such as, e.g., 3D network data path links (3D-NDPL) 844, between nodes disposed in each layer of the multiple layers including auxiliary network data paths between first nodes disposed in the first layer and second nodes disposed in the second layer. Further, in some instances, as shown in FIG. 8, interfacing between logic blocks may be handled with the 3D-NDPLs 844.

In various implementations, cluster caches may also be used as a base requesting element, wherein the caching element distributed across multiple layers may refer to a cluster cache or dynamic shared unit (DSU). L2 caches may still be implemented in 2D, while cluster logic may be implemented in 3D. This may allow the use of 2D core designs in a system that leverages 3D for cluster cache capacity and interconnect bandwidth.

Also, in various implementations, address space interleaving based on hash may be used in 3D structural organizations. For instance, address space interleaving may happen between layers using a simple hash function instead of direct address interleaving, and this may be more useful for the expandable embodiment, where such a technique may provide two-fold benefit. Firstly, this hashing may mitigate the effects of any uneven utilization of the address space by software, wherein data alignment may cause cache and NoC resources in some layers to be more heavily utilized than others, which may lead to sub-optimal resource allocation. Another benefit of using hash functions to distribute the address space is that this may enable non-power-of-2 cache layers in the expandable design. This may be useful with some architectures where system cache capacity is tuned to a specific memory footprint for optimal performance without overhead of rounding up to the next power-of-2 layers.

It should be intended that the subject matter of the claims not be limited to various implementations and/or illustrations provided herein, but should include any modified forms of those implementations including portions of implementations and combinations of various elements in reference to different implementations in accordance with the claims. It should also be appreciated that in development of any such implementation, as in any engineering or design project, numerous implementation-specific decisions should be made to achieve developers' specific goals, such as, e.g., compliance with system-related constraints and/or business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Described herein are various implementations of a device having a multi-layered logic structure with multiple layers including a first layer and a second layer arranged vertically in a stacked configuration. The device may have a first cache memory with first interconnect logic disposed in the first layer. The device may have a second cache memory with second interconnect logic disposed in the second layer, and the second interconnect logic in the second layer is linked to the first interconnect logic in the first layer.

Described herein are various implementations of a device having a multi-layered logic structure having multiple layers that are arranged vertically in a stacked configuration. The device may have core processing logic disposed in a first layer of the multiple layers. The device may have a cache memory split into multiple portions linked together with an inter-layer data link. In addition, a first portion of cache memory may be disposed in a second layer of the multiple layers, and a second portion of cache memory may be disposed in a third layer of the multiple layers.

Described herein are various implementations of a device having a multi-layered logic structure with multiple layers including a first layer and a second layer arranged vertically in a stacked configuration. The device may have an inter-layer data routing network having interconnect logic in each layer of the multiple layers including first interconnect logic in the first layer and second interconnect logic in the second layer that is linked to the first interconnect logic. The inter-layer data routing network may include inter-layer data paths that vertically couple the interconnect logic in each layer together including the first interconnect logic in the first layer to the second interconnect logic in the second layer.

Reference has been made in detail to various implementations, examples of which are illustrated in accompanying drawings and figures. In the following detailed description, numerous specific details are set forth to provide a thorough understanding of the disclosure provided herein. However, the disclosure provided herein may be practiced without these specific details. In various implementations, well-known methods, procedures, components, circuits and networks have not been described in detail so as not to unnecessarily obscure details of the embodiments.

It should also be understood that, although various terms first, second, etc. may be used herein to describe various elements, these elements should not be limited by these terms. These terms are only used to distinguish one element from another. For instance, a first element could be termed a second element, and, similarly, a second element could be termed a first element. Also, the first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and various other similar terms that indicate relative positions above or below a given point or element may be used in connection with various implementations of various technologies described herein.

While the foregoing is directed to implementations of various techniques described herein, other and further implementations may be devised in accordance with the disclosure herein, which may be determined by the claims that follow. Although the subject matter has been described in language specific to structural features and/or methodological acts, it is to be understood that the subject matter defined in the appended claims is not necessarily limited to the specific features or acts described above. Rather, specific features and/or acts described above are disclosed as example forms of implementing the claims.

What is claimed is:

1. A device comprising:
 a multi-layered logic structure with multiple layers including a first layer and a second layer arranged vertically in a stacked configuration, wherein:
 the first layer includes core processing logic and a first cache memory with first interconnect logic and a first router, wherein the core processing logic includes L1 cache memory disposed in the first layer,
 the second layer includes a second cache memory with second interconnect logic and a second router,
 the second interconnect logic in the second layer is linked to the first interconnect logic in the first layer with a first data link, and
 the second router in the second layer is linked to the first router in the first layer with a second data link that is different than the first data link.

2. The device of claim 1, wherein:
 the first cache memory includes first L2 cache memory,
 the second cache memory includes second L2 cache memory,
 the first data link refers to an inter-layer data link that vertically couples the multiple layers together including the first L2 cache memory to the second L2 cache memory, and
 the first interconnect logic is linked to the second interconnect logic by way of the inter-layer data link that vertically couples the first L2 cache memory to the second L2 cache memory in the multi-layered logic structure.

3. The device of claim 1, wherein:
the core processing logic is configured to interface with multiple cache memories including the first cache memory and the second cache memory.

4. The device of claim 3, wherein:
the second layer includes shared cache memory disposed in the second layer of the multiple layers,
the shared cache memory is separate and different from the first cache memory and the second cache memory, and
the shared cache memory is configured to interface with the core processing logic and the multiple cache memories including the first cache memory and the second cache memory.

5. The device of claim 1, wherein:
the first cache memory includes first L2 cache memory,
the second cache memory includes second L2 cache memory, and
the first L2 cache memory and the second L2 cache memory refer to split portions of L2 cache memory such that the first L2 cache memory refers to a first portion of the L2 cache memory and the second L2 cache memory refers to a second portion of the L2 cache memory.

6. The device of claim 1, further comprising:
a multi-dimensional data routing network with at least one router disposed in each layer of the multiple layers including the first router disposed in the first layer and the second router disposed in the second layer that is linked to the first router with the second data link,
wherein the multi-dimensional data routing network includes network data paths that vertically couple the multiple routers together including the first router to the second router.

7. A device comprising:
a multi-layered logic structure having multiple layers that are arranged vertically in a stacked configuration;
core processing logic and L1 cache memory disposed in a first layer of the multiple layers;
an L2 cache memory split into multiple portions linked together with a first inter-layer data link, wherein a first portion of the L2 cache memory is disposed in a second layer of the multiple layers, and wherein a second portion of the L2 cache memory is disposed in a third layer of the multiple layers; and
a routing network having at least one router disposed in each layer of the multiple layers including a first router disposed in the first layer with the L1 cache memory, second router disposed in the second layer with the first portion of L2 cache memory, and a third router disposed in the third layer with the second portion of L2 cache memory,
wherein the second router is linked to the first router with a second inter-layer data link that is different than the first inter-layer data link, and
wherein the third router is linked to the first router and the second router with the second inter-layer data link that is different than the first inter-layer data link.

8. The device of claim 7, wherein:
the first portion of the L2 cache memory has first interconnect logic linked to the processing core logic in the first layer, and
the second portion of the L2 cache memory has second interconnect logic linked to the first interconnect logic in the second layer.

9. The device of claim 8, wherein:
the first inter-layer data link vertically couples the multiple layers together including the first portion of the L2 cache memory to the second portion of the L2 cache memory, and
the first interconnect logic is linked to the second interconnect logic by way of the first inter-layer data link that vertically couples the first portion of the L2 cache memory to the second portion of the L2 cache memory in the multi-layered logic structure.

10. The device of claim 7, wherein:
the core processing logic is configured to interface with the multiple portions of the L2 cache memory by way of the first inter-layer data link including the first portion of the L2 cache memory and the second portion of the L2 cache memory.

11. The device of claim 7, further comprising:
one or more shared cache memories disposed in one or more of the multiple layers including a first shared cache memory disposed in the second layer and a second shared cache memory disposed in the third layer,
wherein the first shared cache memory and the second shared cache memory are separate and different from the first portion of L2 cache memory and the second portion of L2 cache memory, and
wherein the one or more shared cache memories are configured to interface with the core processing logic and each portion of the L2 cache memory including the first portion of the L2 cache memory and the second portion of the L2 cache memory.

12. The device of claim 7, wherein:
the routing network refers to a multi-dimensional data routing network with at least one router disposed in each layer of the multiple layers including the first router disposed in the first layer and the second router disposed in the second layer that is linked to the first router with the second inter-layer data link, and
the multi-dimensional data routing network includes network data paths that vertically couple the multiple routers together including the first router to the second router.

13. The device of claim 7, further comprising:
one or more additional portions of L2 cache memory disposed in one or more additional layers of the multiple layers,
wherein the routing network refers to a multi-dimensional data routing network with at least one router disposed in each layer of the multiple layers,
wherein the one or more additional portions of L2 cache memory are linked to the first portion and the second portion of the L2 cache memories by way of the first inter-layer data link, and
wherein the multi-dimensional data routing network includes network data paths that vertically couple the multiple routers together.

14. A device comprising:
a multi-layered logic structure with multiple layers including a first layer and a second layer arranged vertically in a stacked configuration;
a first inter-layer data routing network having interconnect logic in each layer of the multiple layers including first interconnect logic in the first layer and second interconnect logic in the second layer that is linked to the first interconnect logic by way of the first inter-layer data routing network;

a second inter-layer data routing network having at least one router in each layer of the multiple layers including a first router in the first layer and a second router in the second layer that is linked to the first router by way of the second inter-layer data routing network that is different than the first inter-layer data routing network;

a first logic block disposed in the first layer, wherein the first logic block includes first core processing logic, first L2 cache memory and the first interconnect logic; and a second logic block disposed in the second layer, wherein the second logic block includes second core processing logic, second L2 cache memory and the second interconnect logic, wherein the first inter-layer data routing network includes first inter-layer data paths that vertically couple the interconnect logic in each layer together including the first interconnect logic in the first layer to the second interconnect logic in the second layer by way of the first inter-layer data routing network, and wherein the second inter-layer data routing network includes second inter-layer data paths that vertically couple the at least one router in each layer together including the first router in the first layer to the second router in the second layer by way of the second inter-layer data routing network, which is different than the first inter-layer data routing network that is different than the first inter-layer data routing network.

15. The device of claim 14, further comprising:
an auxiliary data network that provides auxiliary network data paths between nodes disposed in each layer of the multiple layers including auxiliary network data paths between first nodes disposed in the first layer and second nodes disposed in the second layer.

16. The device of claim 14, wherein:
the interconnect logic in each layer of the multiple layers refers to L2 cache memory with inter-layer data links that vertically couple the multiple layers together including the first interconnect logic in the first layer to the second interconnect logic in the second layer, and
the first interconnect logic is linked to the second interconnect logic by way of the inter-layer data links that vertically couple a first L2 cache memory in the first layer to a second L2 cache memory in the second layer of the multi-layered logic structure.

17. The device of claim 14, wherein:
the first logic block includes first shared cache memory,
the second logic block includes second shared cache memory, and
the first shared cache memory and the second shared cache memory are separate and different from the first L2 cache memory and the second L2 cache memory.

18. The device of claim 17, wherein:
the first logic block refers to multiple first logic blocks disposed together in the first layer, wherein each first logic block includes the first interconnect logic along with the first core processing logic, the first L2 cache memory and the first shared cache memory; and
the second logic block refers to multiple second logic blocks disposed together in the second layer, wherein each second logic block includes the second interconnect logic along with the second core processing logic, the second L2 cache memory and the second shared cache memory.

19. The device of claim 14, further comprising:
a first logic block disposed in the first layer, wherein the first logic block includes the first interconnect logic along with core processing logic and first L2 cache memory; and
a second logic block disposed in the second layer, wherein the second logic block includes the second interconnect logic along with shared cache memory and second L2 cache memory.

20. The device of claim 19, wherein:
the first logic block refers to multiple first logic blocks disposed together in the first layer, wherein each first logic block includes the first interconnect logic along with the core processing logic and the first L2 cache memory; and
the second logic block refers to multiple second logic blocks disposed together in the second layer, wherein each second logic block includes the second interconnect logic along with the shared cache memory and the second L2 cache memory.

* * * * *